Feb. 5, 1957    B. F. AMBROSIO    2,780,795
DISTANCE MEASUREMENTS BY SONIC MEANS
Filed May 28, 1953

INVENTOR.
Biagio F. Ambrosio
BY
ATTORNEYS

United States Patent Office 2,780,795
Patented Feb. 5, 1957

2,780,795

DISTANCE MEASUREMENTS BY SONIC MEANS

Biagio F. Ambrosio, Los Angeles, Calif.

Application May 28, 1953, Serial No. 358,220

7 Claims. (Cl. 340—3)

(Granted under Title 35, U. S. Code (1952), sec. 266)

The invention described herein may be manufactured and used by or for the Government of the United States of America for governmental purposes without the payment of any royalties thereon or therefor.

This invention relates to a direct reading, compensated, distance measuring system of the type wherein distances are determined as a function of the time required for sonic wave energy to travel the distance to be measured.

In sonic measuring systems, it is important that the temperature (and also humidity if measurements are made in air) of the medium in which measurements are to be made be considered because of the appreciable effect that these conditions have upon the speed with which sound waves travel. It is highly desirable that any required corrections be made automatically and the final result displayed in an easily read fashion. In the instant invention, an oscillator generates a periodic wave, the cycles of which are counted during the time it takes for a short pulse of that same wave to travel over the distance to be measured and back again. The frequency of the oscillator is varied to compensate for ambient changes in temperature, humidity, and other variables affecting the rate of travel of the wave energy used.

The invention also comprises a method of utilizing electrical and sonic energy in the manner indicated to measure distances.

An object of the invention is to provide an improved method and apparatus wherein electrical and sonic energy are utilized for reliably and accurately measuring distances under varying conditions of temperature and humidity.

Other objects and many of the attendant advantages of this invention will be readily appreciated as the same becomes better understood by reference to the following description.

Figure 1:
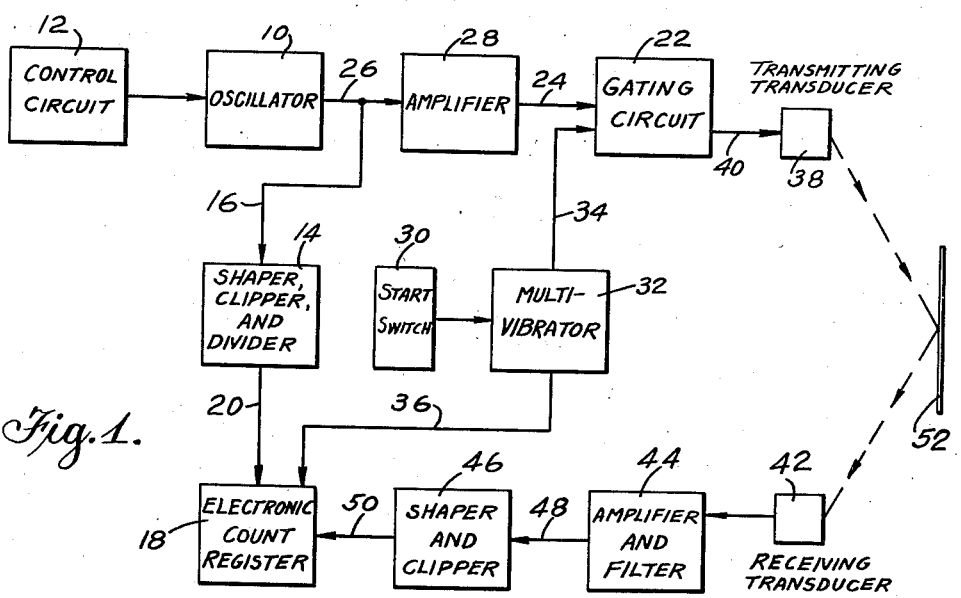
Figure 2:
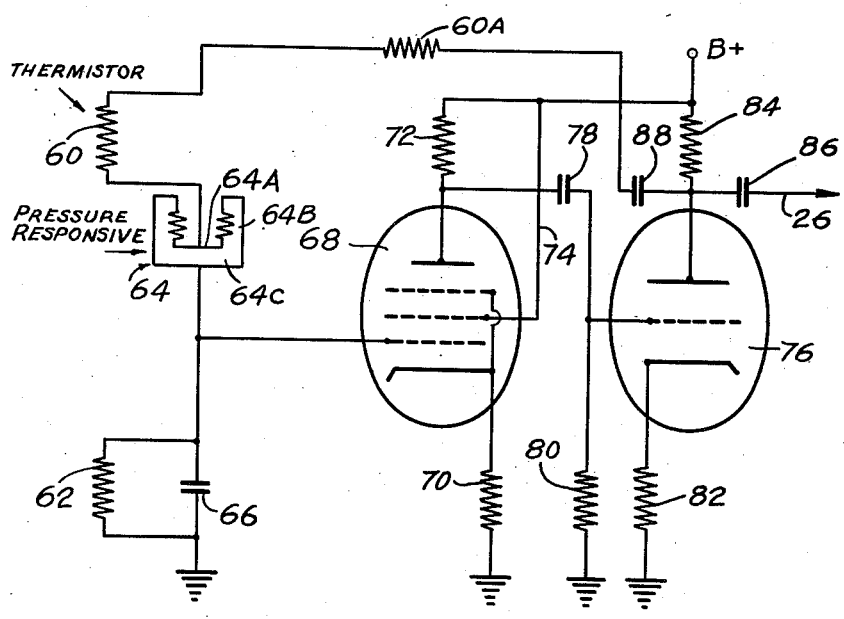

Fig. 1 is a schematic diagram showing in block form the component parts of a compensated distance measuring system; and Fig. 2 is a schematic diagram of a suitable form of temperature compensating oscillator circuit.

The oscillator 10 of Fig. 1 may assume any of the various forms, such as a Wien bridge type, for example, known to workers in the art. Control circuit 12 contains means for varying the frequency of oscillator 10 over a limited range through the application of elements hereinafter more fully described. Oscillator output is sent to the combined sharper, clipper and divider 14 through lead 16 and the output of the circuit represented by block 14 is connected with electronic count register 18 through lead 20. A portion of oscillator output is also provided to gating circuit 22 through leads 24 and 26 and amplifier 28. A start switch 30 is connected to multivibrator 32 which is connected to gating circuit 22 through lead 34 and to count register 18 through lead 36. The output of gating circuit 22 is connected to transmitting transducer 38, which may be of conventional design such as a piezo-electric type, through lead 40. Receiving transducer 42 is connected to combined amplifier and filter 44, the output of which is in turn connected to electronic register 18 through combined shaper and clipper 46 and leads 48 and 50. The object giving rise to the echo is shown as a plane surface 52.

In the operation of the above described device, it is convenient to set oscillator 10 at a frequency related to the speed of sound under prevailing conditions. For example, at sea level the speed of sound in dry air is 1116 feet per second at a temperature of 59° F. For measuring distances under these circumstances the oscillator is set at 11160 cycles per second so that for every foot of distance travelled 10 cycles elapse. The oscillator output is continuously applied to counter 18 through shaper, clipper, and divider 14, but no counting is performed until gate 22 is opened through the action of pulse control circuit 32. Start switch 30 is actuated, either manually or by any desired automatic means, to cause a flip-flop multivibrator in pulse control circuit 32 to change position. As the flip-flop changes position, a sharp pulse is sent over lead 36 to trigger the counter. A pulse is also sent over lead 34 to open gate circuit 22. The flip-flop in pulse control circuit 32 is adjusted to spontaneously change position after about ten or twelve cycles of oscillator output; the gate circuit 22 is closed by the second sharp pulse generated by this change in position but counter 18 is not stopped thereby. The output from gate circuit 22 is converted from electrical into sonic energy and is transmitted into space by transmitting transducer 38. The signal then travels until it is reflected back from an obstacle and is intercepted by receiving transducer 42. The resulting signal is amplified and shaped to form a sharp pulse which tells the counter to stop counting. The distance in feet may then be read off directly from the number of cycles counted. The purpose of the divider in block 14, which divides by a factor of two, is to compensate for the fact that the distance to be measured is travelled twice by the pulse, once going to the obstacle and once returning.

Oscillator 10 and control circuit 12 of Fig. 1 are shown in detail in Fig. 2 in which the output frequency on lead 26 is determined by the characteristics of resistors 60 and 62, capacitor 66, and pressure-responsive capacitor 64. For purposes of temperature compensation, temperature sensitive resistors 60 and 62, which may conveniently be of the type known as thermistors, are positioned in the medium through which the sound is to travel in order that the resistances thereof will change with ambient temperature changes. The oscillator includes pentode 68 having cathode resistor 70 and plate resistor 72. Lead 74 provides means for applying a voltage to the screen grid of pentode 68. The output of the pentode is coupled to the grid of triode 76 through capacitor 78. The triode is provided with grid resistor 80, cathode resistor 82, and plate resistor 84 which is connected to a source of B+ voltage. The output of triode 76 is taken through capacitor 86 to lead 26 and to resistor 60 through capacitor 88.

In the above described circuit, the bridge oscillator operates in the conventional manner. In order to simplify the construction and calibration of the oscillator, resistors 60 and 62 are matched and pressure-responsive capacitor 64 and capacitor 66 are likewise matched. The output frequency of the oscillator is then:

$$F_0 = \frac{1}{2\pi R_{60} C_{64}}$$

where $F_0$ is output frequency, $R_{60}$ is the resistance of resistor 60, and $C_{64}$ is the capacitance of pressure-responsive capacitor 64. It is evident from an inspection of the above equation that $F_0$ must vary as $R_{60}$ varies, assuming that $C_{64}$ remains constant. Accordingly, any of the well known types of resistances which will vary as the humidity of the surrounding atmosphere varies may be substituted for resistor 60 or may be placed in series therewith as shown by resistor 60A. It is also possible to utilize the change in capacity of pressure-responsive capacitor 64 to regulate oscillator frequency. For example, a movable diaphragm 64A forming one wall of a sealed container 64B will, in conjunction with a parallel fixed wall 64C of the container, form a capacitor which varies in capacitance as the air pressure exerted on the diaphragm varies. Similarly, components which vary in resistance or capacity as the surrounding pressure changes may be inserted in the oscillator circuit to compensate for such changes.

In the operation of the above described compensating circuits, a change in conditions which will vary the speed of sound in the surrounding medium will also vary the oscillator frequency. For small variations, the rate of change of the speed of sound will be closely matched by the change in oscillator frequency through the action of the compensating elements. Over a wide range of variations in the speed of sound, such as occur with marked changes in temperature, the relationship between the curve for the speed of sound plotted against temperature and the curve for oscillator frequency plotted against temperature may not be exact. Fortunately, it is possible, through the use of networks, to match the output curve of the electronic system to any desired curve within reasonable limits. The techniques for doing this are well known and need not be discussed here.

Obviously many modifications and variations of the present invention are possible in the light of the above teachings. It is therefore to be understood that within the scope of the appended claims the invention may be practiced otherwise than as specifically described.

What is claimed is:

1. A sound ranging system comprising an oscillator, a transducer effective to emit a sound wave when energized by the output of said oscillator, a gating circuit for gating the output of said oscillator to said transducer, a receiving transducer effective to receive echoes of sound waves transmitted by said transmitting transducer, an electronic count register, means for triggering said register to stop counting when a sound wave transmitted upon the opening of said gating circuit has echoed and returned to said receiving transducer, and a condition responsive element connected to said oscillator effective to raise or lower the frequency of said oscillator as changes in said condition increase or decrease respectively the speed of sound in the surrounding fluid.

2. A sound ranging system comprising an oscillator, a transducer effective to emit a sound wave when energized by the output of said oscillator, a gating circuit for gating the output of said oscillator to said transducer, a receiving transducer effective to receive echoes of sound waves transmitted by said transmitting transducer, an electronic count register, means for triggering said register to stop counting when a sound wave transmitted upon the opening of said gating circuit has echoed and returned to said receiving transducer, and a pressure responsive element connected to said oscillator effective to raise or lower the frequency of said oscillator as pressure changes increase or decrease respectively the speed of sound in the surrounding fluid.

3. The invention defined in claim 2, said condition responsive element comprising a humidity responsive element connected to said oscillator effective to raise or lower the frequency of said oscillator as humidity changes increase or decrease respectively the speed of sound in the surrounding fluid.

4. In a distance measuring apparatus, a generator for generating sound waves at a determinable frequency, means for projecting sound waves generated by said generator, and temperature sensitive resistance means for varying said frequency to compensate for variations in the speed of said projected sound waves due to variations in temperature in the fluid media through which said sound waves are projected.

5. The invention defined in claim 1, said condition responsive element comprising pressure sensitive capacitor means connected to said oscillator effective to vary the frequency of said oscillator as pressure changes vary the speed of sound in its surrounding fluid media.

6. In a distance measuring device, a generator for generating sound waves at a determinable frequency, means for projecting sound waves generated by said generator, temperature sensitive means, humidity sensitive means, and pressure sensitive means connected to said generator for varying said frequency to compensate for variations in the speed of said projected sound waves due to variations in temperature, humidity and pressure in the fluid media through which said sound waves are projected.

7. Apparatus for measuring distance in a medium comprising means for generating a signal of predetermined base frequency, a sonic projector, gating means for feeding said signal to said projector, electronic means for counting cycles of said signal, means for simultaneously actuating said gating means and initiating operation of said counting means, means for receiving an echo of the sonic wave emitted by said projector, means for applying said echo to said counting means to terminate the count thereof, and means for varying the counting rate of said counting means in accordance with condition changes in said medium which vary velocity of sonic waves therein, said counting rate varying means comprising means in the circuit of said generating means and responsive to said condition changes for shifting the frequency of said signal from said base frequency.

References Cited in the file of this patent

UNITED STATES PATENTS

| 2,235,019 | Johannson | Mar. 18, 1941 |
| 2,274,262 | Wolff | Feb. 24, 1942 |
| 2,433,385 | Miller | Dec. 30, 1947 |
| 2,473,610 | Rieber | June 12, 1949 |